(12) United States Patent
Okada et al.

(10) Patent No.: US 12,145,747 B2
(45) Date of Patent: Nov. 19, 2024

(54) AIRCRAFT COMPONENT ASSEMBLY JIG AND AIRCRAFT COMPONENT INSPECTION TOOL

(71) Applicant: Kawasaki Jukogyo Kabushiki Kaisha, Kobe (JP)

(72) Inventors: Hideki Okada, Kakamigahara (JP); Shuji Matsui, Gifu (JP); Fuminori Yano, Ichinomiya (JP); Kenji Kasahara, Gifu (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 746 days.

(21) Appl. No.: 17/185,960

(22) Filed: Feb. 26, 2021

(65) Prior Publication Data
US 2021/0253273 A1    Aug. 19, 2021

Related U.S. Application Data

(63) Continuation of application No. PCT/JP2019/034211, filed on Aug. 30, 2019.

(Continued)

(51) Int. Cl.
  *B64F 5/10*    (2017.01)
  *B64C 1/06*    (2006.01)
  (Continued)

(52) U.S. Cl.
  CPC .............. *B64F 5/10* (2017.01); *B64C 1/06* (2013.01); *B64F 5/60* (2017.01); *G05B 13/024* (2013.01); *G05B 19/418* (2013.01); *B64C 1/12* (2013.01)

(58) Field of Classification Search
None
See application file for complete search history.

(56) References Cited

U.S. PATENT DOCUMENTS

| | | | |
|---|---|---|---|
| 4,641,819 A * | 2/1987 | Poland | B23K 37/0443 269/45 |
| 6,121,781 A * | 9/2000 | Martinez | B25B 11/005 324/661 |

(Continued)

FOREIGN PATENT DOCUMENTS

| | | |
|---|---|---|
| DE | 19745145 A1 | 4/1998 |
| JP | 2017-193241 A | 10/2017 |

(Continued)

*Primary Examiner* — David Earl Ogg
(74) *Attorney, Agent, or Firm* — XSENSUS LLP

(57) ABSTRACT

An aircraft component assembly jig includes: header plates; positioners provided on each of the header plates, each positioner including a receiver that comes into contact with a lower/upper surface of an aircraft component, each positioner causing the receiver to advance and retract; receiver state detectors, that each detects, as control data, a supporting state of a corresponding one of the receivers; and a circuitry. The circuitry compares each of detection values of the control data with a preset reference value to determine whether an equal support state is achieved, the equal support state being a state where all the receivers are equally supporting the aircraft component. If it is determined that the equal support state is not achieved, the circuitry controls an adjustment-requiring positioner among all the positioners to adjust an advancing/retracting position of the receiver of the adjustment-requiring positioner within a design tolerance.

11 Claims, 10 Drawing Sheets

Related U.S. Application Data

(60) Provisional application No. 62/725,690, filed on Aug. 31, 2018.

(51) Int. Cl.
*B64C 1/12* (2006.01)
*B64F 5/60* (2017.01)
*G05B 13/02* (2006.01)
*G05B 19/418* (2006.01)

(56) References Cited

U.S. PATENT DOCUMENTS

| | | | |
|---|---|---|---|
| 2007/0020065 A1* | 1/2007 | Kirby | B23Q 1/035 414/1 |
| 2009/0322008 A1* | 12/2009 | Freeland | B25B 11/005 269/296 |
| 2016/0075450 A1* | 3/2016 | Hunt | B64F 5/10 264/320 |
| 2019/0127088 A1 | 5/2019 | Kasahara et al. | |
| 2019/0144134 A1 | 5/2019 | Kasahara et al. | |
| 2021/0171181 A1* | 6/2021 | Hirai | B25B 11/005 |

FOREIGN PATENT DOCUMENTS

| | | | |
|---|---|---|---|
| JP | 2017-193242 A | 10/2017 | |
| WO | WO-2007137812 A1 * | 12/2007 | B64F 5/0009 |
| WO | 2017/134901 A1 | 8/2017 | |

\* cited by examiner

AIRCRAFT COMPONENT ASSEMBLY JIG AND AIRCRAFT COMPONENT INSPECTION TOOL

CROSS-REFERENCE TO RELATED APPLICATIONS

The present application claims priority to PCT/JP2019/034211, filed Aug. 30, 2019, which claims the benefit of U.S. Provisional Application No. 62/725,690, filed Aug. 31, 2018, the entire contents of each are incorporated herein by its reference.

TECHNICAL FIELD

The present disclosure relates to an aircraft component assembly jig that makes it possible to improve assemblability when assembling an aircraft component such as an aircraft fuselage panel or skin, and to an aircraft component inspection tool capable of accurately determining whether or not an aircraft component that has been assembled has a proper component shape.

BACKGROUND

There are component assembly jigs that are used for assembling an aircraft component, such as an aircraft fuselage panel. Among those jigs, for example, there is a known component assembly jig called AJ (AJ stands for Assembly Jig). Generally speaking, it is often the case that in order to be able to hold a component (e.g., a fuselage skin, fuselage frame, fuselage panel, etc.) that has an ideal shape drawn on CAD, the AJ is configured to hold the component on points, or along a line, at an ideal component receiving position drawn on CAD (or at a position where the design tolerance is minimal).

For example, Patent Literature 1 or Patent Literature 2 discloses a known configuration of such an AJ. The AJ disclosed by Patent Literature 1 includes: a base provided with frame indexes for positioning both ends of aircraft fuselage frames; header plates, each of which protrudes from the base so as to extend along an aircraft fuselage panel, the header plates being arranged parallel to each other in the axial direction of the aircraft fuselage panel; and electric cylinders radially provided on each of the header plates, the electric cylinders moving respective receiving members in the radial direction of the aircraft fuselage panel, the receiving members contacting a skin included in the aircraft fuselage panel. The AJ disclosed by Patent Literature 1 can be used for aircraft fuselage panels having different sizes or different shapes.

The AJ disclosed by Patent Literature 1 adjusts the strokes of the electric cylinders to set the receiving members to ideal positions on CAD, thereby allowing a skin, panel, or the like to be placed at a proper position, and at the position, the skin, panel, or the like is fastened to, for example, frames. The AJ disclosed by Patent Literature 2 has a similar configuration to that disclosed by Patent Literature 1. The AJ disclosed by Patent Literature 2 includes air lifting devices that air-lift the skin from receiving surfaces of the respective receiving members to support the aircraft fuselage panel in such a manner that the aircraft fuselage panel is slidable.

CITATION LIST

Patent Literature

PTL 1: Japanese Laid-Open Patent Application Publication No. 2017-193241

PTL 2: Japanese Laid-Open Patent Application Publication No. 2017-193242

In a case where the aircraft component is a large structure, such as a fuselage panel, even if the aircraft component is manufactured to have a shape within the design tolerance, when the aircraft component in an assembly orientation is placed on the AJ at an ideal position exactly as indicated on CAD, there is still a possibility that the aircraft component is not entirely placed on all the receiving members, but comes into contact with only part of the receiving members (i.e., partial contact).

The present inventors, as a result of their studies, have found that the part of the receiving members, which come into partial contact with the aircraft component, lift the skin or panel, and consequently, part of the skin or panel becomes slightly flipped upward. In particular, for example, at an end portion (or a peripheral edge) of the skin or panel, such upward flipping occurs to a greater degree, which makes proper assembling of the skin or panel impossible. Depending on some conditions, slight lifting of the skin or panel by the receiving members causes a significantly great degree of upward flipping at an end portion of the skin or panel, and as a result, the skin or panel becomes so spaced apart from its adjacent skin or panel that the skin or panel cannot be fastened to the adjacent skin or panel by rivets.

SUMMARY

An aircraft component assembly jig according to the present disclosure is configured to include: header plates that are, in a state where an aircraft component is placed on the aircraft component assembly jig, arranged in a predetermined direction of the aircraft component, each header plate having such a shape that, in the state where the aircraft component is placed on the aircraft component assembly jig, each header plate extends along a lower surface or an upper surface of the aircraft component; positioners provided on each of the header plates, each positioner including, at a distal end thereof, a receiving member that comes into contact with the lower surface of the aircraft component, each positioner causing the receiving member to advance and retract; a controller that controls the positioners such that the positioners are drivable independently of each other; and receiving member state detectors, each of which detects control data in the state where the aircraft component is placed on the aircraft component assembly jig, in which state the lower surface of the aircraft component is supported by at least a plurality of the receiving members, each receiving member state detector detecting, as the control data, a supporting state of a corresponding one of the receiving members supporting the lower surface of the aircraft component. The controller is configured to: compare each of detection values of the detected control data with a preset reference value to determine whether or not an equal support state is being achieved, the equal support state being a state where all the receiving members are equally supporting the aircraft component; and if it is determined that the equal support state is not being achieved, control at least one of all the positioners to adjust an advancing/retracting position of the receiving member of the at least one positioner within a design tolerance.

According to the above configuration, the supporting state (i.e., the state of receiving the lower surface) of each of the receiving members supporting the lower surface of the aircraft component is detected as the control data. Based on the control data, the controller determines whether or not the receiving members are equally supporting the lower surface of the aircraft component (i.e., determines whether or not the equal support state is being achieved).

An aircraft component inspection tool according to the present disclosure is configured to include: header plates that are, in a state where an aircraft component is placed on the aircraft component inspection tool, arranged in a predetermined direction of the aircraft component, each header plate having such a shape that, in the state where the aircraft component is placed on the aircraft component inspection tool, each header plate extends along a lower surface or an upper surface of the aircraft component; positioners provided on each of the header plates, each positioner including, at a distal end thereof, a receiving member that comes into contact with the lower surface of the aircraft component, each positioner causing the receiving member to advance and retract; and a controller that controls the positioners such that the positioners are drivable independently of each other. In a state where the receiving members are set to respective nominal positions, the aircraft component is placed on at least the receiving members. The controller is configured to: in a state where the aircraft component is placed on the receiving members, determine whether or not an equal support state is being achieved, the equal support state being a state where the receiving members are equally supporting the aircraft component; if it is determined that the equal support state is not being achieved, control the positioners to cause at least one of the receiving members to advance and/or retract within a design tolerance; and if it is determined that the equal support state is not achievable by causing the at least one receiving member to advance and/or retract within the design tolerance, determine that the aircraft component does not have a proper component shape.

BRIEF DESCRIPTION OF DRAWINGS

FIG. 7A shows one example of a space between coupling portions of members that are to be coupled to each other, the space being formed when a conventional aircraft component assembly jig is used, whereas

Figure 1:
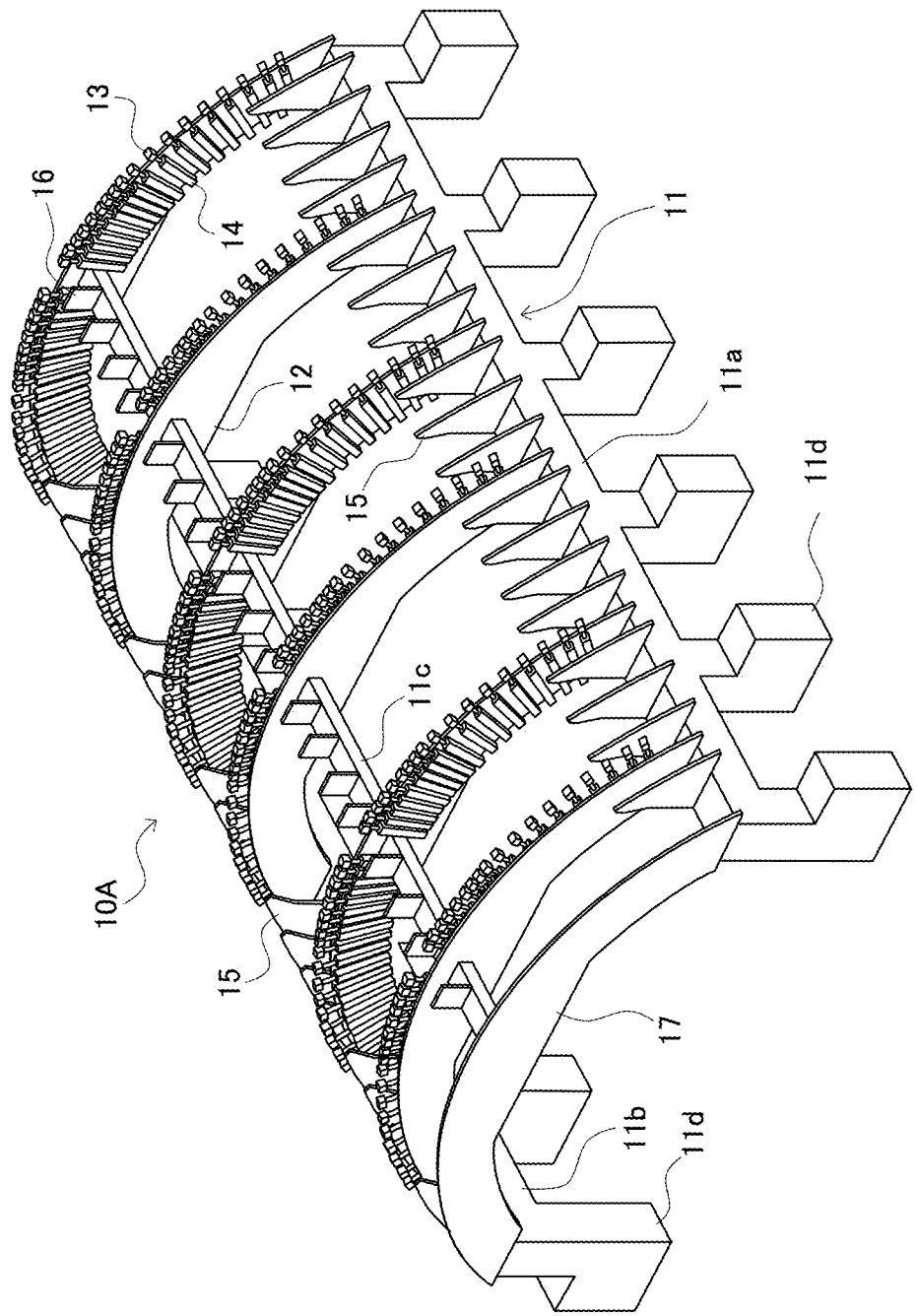
FIG. 1 is a schematic perspective view showing a representative configuration example of an aircraft component assembly jig according to an exemplary embodiment of the present disclosure.

DESCRIPTION OF EMBODIMENTS (Fundamental Configurations of an Aircraft Component Assembly Jig and an Aircraft Component Inspection Tool)

Both an aircraft component assembly jig and an aircraft component inspection tool according to the present disclosure have the same fundamental configuration, in which: in a state where receiving members of an AJ (Assembly Jig) are set to respective nominal positions (i.e., ideal positions on computer-aided design (CAD)), an aircraft component, typically a skin or panel, is placed on the AJ; thereafter, the state of each receiving member when the skin, panel, or the like is placed on the AJ (e.g., a load applied to each receiving member, or a gap between each receiving member and the aircraft component placed on the AJ) is detected and fed back; and the positions of the respective receiving members are adjusted within a predetermined range that is allowed by the design tolerance.

With this fundamental configuration, the aircraft component assembly jig according to the present disclosure makes it possible to place the aircraft component on the AJ without causing a situation in which part of the receiving members lift the skin, panel, or the like, i.e., allowing the aircraft component to properly keep its shape when placed on the AJ. Moreover, as a result of studies conducted by the present inventors, they have found on their own that whether or not the shape of the aircraft component is a proper shape can be determined by applying the fundamental configuration, in which the positions of the respective receiving members are adjusted within the predetermined allowable range by utilizing the feedback. Based on the findings, the inventors have on their own come up with the aircraft component inspection tool according to the present disclosure.

The aircraft component assembly jig and the aircraft component inspection tool according to the present disclosure have the same hardware features as those of the AJs disclosed by Patent Literatures 1 and 2. Therefore, the disclosures of Patent Literatures 1 and 2 are incorporated herein by reference.

In the present disclosure, the AJ includes receiving members. The position of each of the receiving members is changeable (i.e., each of the receiving members is advanceable and retractable) in a direction perpendicular to an aircraft component placed on the AJ or in a direction specified by, for example, a slide shaft. The AJ of the present disclosure further includes positioners and a controller. The positioners change the positions of the respective receiving members. The positioners are, for example, electric cylinders. The controller is capable of controlling the receiving members.

In the AJ of the present disclosure, the state of each of the receiving members (or the electric cylinders, for example) when the aircraft component is placed on the AJ is detectable at each of the receiving members (or the electric cylinders, for example). The AJ of the present disclosure includes a determiner that determines, based on the detected states of the respective receiving members, whether or not all the receiving members are equally supporting the aircraft component. The controller and the determiner may be constituent elements that are independent of each other. Alternatively, the controller and the determiner may be integrated together as a single constituent element. In embodiments described below, the determiner of the aircraft component assembly jig is configured as an "equal support determiner," and the determiner of the aircraft component inspection tool is configured as an "inspection result determiner."

In the present disclosure, regardless of whether the AJ is the aircraft component assembly jig or the aircraft component inspection tool, the control flow or the like of the AJ includes, for example, the following steps (1) to (5).

(1) For example, by numerical control (NC), the receiving members of the AJ are set to respective nominal positions on the CAD shape of an aircraft component to be placed on the AJ.

(2) The aircraft component is placed on the AJ.

(3) The state of each of the receiving members (or the electric cylinders, for example) when the aircraft component is placed on the AJ is detected by a corresponding one of state sensors (receiving member state detectors) that are provided for the respective receiving members (or the electric cylinders, for example). As one example, if the state to be detected is a distance, a gap, or the like between the aircraft component and each of the receiving members, then a laser or the like can be used for the detection. As another example, if the state to be detected is a load, then a load cell or force sensor can be used for the detection, or, as yet another example, an electric current value of a servomotor or the like can be used for the detection.

(4) Based on the detected states of the respective receiving members (or the electric cylinders, for example), it is determined whether or not all the receiving members are equally supporting the component. A specific method used for performing the determination is not particularly limited. Various determination methods are adoptable. For example, it is conceivable to adopt a method by which to determine whether or not the detected states are within a desired range of deviation from a reference value. It is also conceivable to adopt a method by which to determine whether or not the detected states are less than or equal to a threshold, or a method by which to determine whether or not the detected states are greater than or equal to a threshold.

(5) If it is determined that not all the receiving members are equally supporting the component, then in the case of the aircraft component assembly jig, the positions of the respective receiving members are adjusted within a predetermined range (e.g., within the design tolerance) in accordance with detected state values, whereas in the case of the aircraft component inspection tool, the component is determined as either a non-defective product or a defective product based on a predetermined condition (e.g., based on whether or not a solution is found by causing motion of the receiving members within the design tolerance).

It should be noted that, in the present disclosure, the AJ may include the following additional elements. For example, in order to detect the placement state of the panel more precisely, sub sensors may be installed in addition to a main sensor (e.g., a sensor that measures a load is used as the main sensor, and sensors that measure a distance, a gap, or the like are used as the sub sensors; and the sub sensors are used together with the main sensor). Alternatively, after the positions of the respective receiving members are adjusted, interfacing portions, such as coupling portions of panels that are to be coupled to each other, or the placement state of the panels, may be checked based on an image that shows the interfacing portions or the placement state of the panels, the image being captured by a camera or the like. Then, whether or not to perform assembling may be finally determined.

Further, as described below, the configuration of the aircraft component assembly jig can be applied to an inspection tool (an aircraft component inspection tool) for inspecting a panel or the like. In the inspection, whether an aircraft component is a defective product or a non-defective product is determined in the above-described manner. That is, even when the positional adjustment of the receiving members is performed repeatedly, if a solution is not found by causing motion of the receiving members within the design tolerance (e.g., an equal support state where all the receiving members are equally supporting the aircraft component is not achieved unless the receiving members are moved from their nominal positions by such amounts as to exceed the design tolerance; the loads applied to the respective receiving members cannot be evened out by moving the receiving members within the design tolerance; or there is a gap formed between the component to be inspected and the receiving members), then the aircraft component may be determined as a defective product.

Since the AJ according to the present disclosure has the above-described fundamental configuration, even an aircraft component that is a large structure, such as a skin, can be placed on the AJ without causing partial contact with the receiving members. This makes it possible to keep a proper assembly orientation of the aircraft component without causing the aircraft component to be flipped upward. In addition, the AJ according to the present disclosure makes it possible to perform more precise positional adjustment of important interfacing portions, such as coupling portions of panels that are to be coupled to each other, without applying excessive force to the structure.

Hereinafter, a representative embodiment of the present disclosure is described with reference to the drawings. In the drawings, the same or corresponding elements are denoted by the same reference signs, and repeating the same descriptions is avoided below.

In an exemplary embodiment, a specific description of one representative example of the aircraft component assembly jig is given. First, one example of a specific structure of the aircraft component assembly jig according to this exemplary embodiment is described with reference to FIG. 1 and FIG. 2.

[Example of the Structure of the Aircraft Component Assembly Jig]

Figure 2:
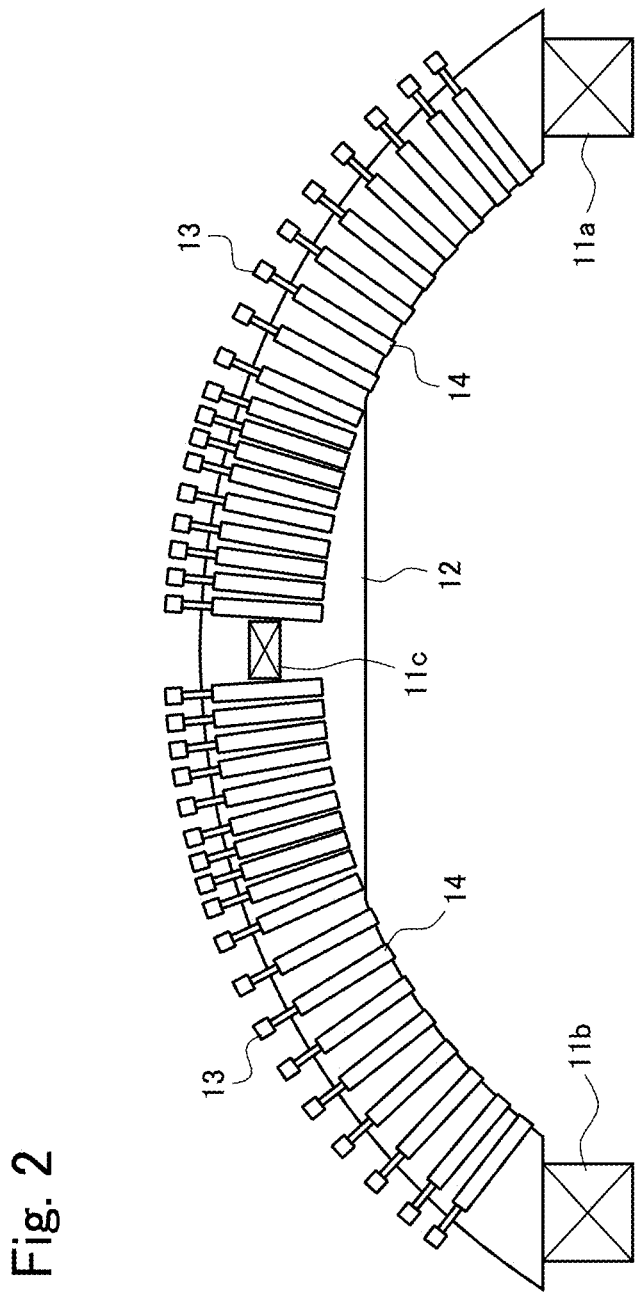
FIG. 2 is a schematic front view showing a representative configuration example of a header plate included in the aircraft component assembly jig of FIG. 1.

As shown in FIG. 1 and FIG. 2, an aircraft component assembly jig 10A according to this exemplary embodiment includes a base 11, header plates 12, a plurality of receiving members 13, positioners 14, frame indexes 15, frame indexes 16, an end plate 17, etc. In this exemplary embodiment, an aircraft component to be supported by the aircraft component assembly jig 10A is, for example, an aircraft fuselage panel.

The base 11 is a base that supports the lower part of aircraft component assembly jig 10A. The base 11 includes: a pair of side beams 11a and 11b; a center beam 11c positioned between the side beams 11a and 11b; and support pillars 11d provided on each of the side beams 11a and 11b. In FIG. 1, the side beam 11a is positioned on the front side in the drawing, and the side beam 11b is positioned on the back side in the drawing. The unshown aircraft fuselage panel is, for example, rectangular and curved in a manner to protrude outward along the axial direction of the fuselage. The aircraft fuselage panel is placed on the top of the aircraft component assembly jig 10A. Accordingly, the base 11 of the aircraft component assembly jig 10A is preferred to have a length corresponding to the shape of the aircraft fuselage panel.

The length of the aircraft fuselage panel in the axial direction is not particularly limited, and is suitably set in accordance with various conditions, such as the type of the aircraft, the structure of the fuselage, etc. Typically, the aircraft fuselage panel has such a rectangular shape that the length of the aircraft fuselage panel in the axial direction is greater than the length of the aircraft fuselage panel in the width direction orthogonal to the axial direction (i.e., the shape is long in the axial direction). Accordingly, the base 11 of the aircraft component assembly jig 10A shown in FIG. 1 also has a rectangular shape similar to that of the aircraft fuselage panel, and the pair of side beams 11a and 11b has a length corresponding to the length of the aircraft fuselage panel in the axial direction.

It goes without saying that if the length of the aircraft component assembly jig 10A (the base 11) in the longitudinal direction is sufficiently long, not only a rectangular aircraft fuselage panel whose length in the axial direction is relatively great (long), but also an aircraft fuselage panel whose length in the axial direction is relatively small (short) (e.g., an aircraft fuselage panel having a square shape or a rectangular shape that is long in the width direction) can be placed on the aircraft component assembly jig 10A.

The header plates 12 are provided between the pair of side beams 11a and 11b, and each of the header plates 12 extends in a direction crossing (preferably orthogonal to) the side beams 11a and 11b. In the example shown in FIG. 1, a total of five header plates 12 are provided on the upper surfaces of the side beams 11a and 11b, such that the header plates 12 are parallel to each other and such that each header plate 12 extends between the side beams 11a and 11b in a bridging manner. The support pillars 11d are provided on the lower surfaces of the side beams 11a and 11b (in FIG. 1, each of the side beams 11a and 11b is provided with six support pillars 11d). Accordingly, the upper surfaces of the side beams 11a and 11b are positioned above and away from the ground by a distance corresponding to the height of the support pillars 11d (and the height of the side beams 11a and 11b).

Each header plate 12 has such a shape that, in a state where the aircraft fuselage panel is placed on the header plates 12, each header plate 12 extends along the lower surface (or the upper surface) of the aircraft fuselage panel. In the example shown in FIG. 1 and FIG. 2, each header plate 12 is configured as a plate member that is curved in a manner to protrude upward. As shown in FIG. 1 and FIG. 2, the receiving members 13 and the positioners 14 are provided on and fixed to each header plate 12, such that the receiving members 13 extend radially upward.

As one example, the header plates 12 are arranged parallel to each other in a predetermined direction of the aircraft component. In the present embodiment, the header plates 12 are arranged parallel to each other in the axial direction of the aircraft fuselage panel. The arrangement of the header plates 12 is not limited to a parallel arrangement. For example, the header plates 12 may be arranged in a manner to cross each other in a predetermined direction, or a parallel arrangement and crossing arrangement may be combined. In an exemplary embodiment, as seen in FIG. 2, each header plate 12 extends vertically from the inner side towards the outer side. Each receiving member 13 radiates outward (out of plane direction) such that each receiving member 13 is orthogonal to the outer surface of the header plate 12.

The number of header plates 12 included in the aircraft component assembly jig 10A is not particularly limited, but may be suitably set in accordance with various conditions, such as the axial directional length of the aircraft fuselage panel to be placed on the aircraft component assembly jig 10A and the structure of the aircraft fuselage panel. In the example shown in FIG. 1, the distance between each pair of adjacent header plates 12 is not the same. For example, the distance between one pair of adjacent header plates 12 is relatively narrower, or the distance between another pair of adjacent header plates 12 is relatively wider, compared to other pairs of adjacent header plates 12. The distance between each pair of adjacent header plates 12 is not particularly limited, but may be suitably set in accordance with various conditions of the aircraft fuselage panel.

As previously mentioned, the center beam 11c is positioned between the side beams 11a and 11b, and these three beam members are parallel to each other. That is, similar to the side beams 11a and 11b, the center beam 11c extends in the axial direction of the aircraft fuselage panel. The center beam 11c crosses all the header plates 12. In the example shown in FIG. 1, the center beam 11c penetrates the center portions of the header plates 12.

The first frame indexes 15 are provided on the upper surfaces of the pair of side beams 11a and 11b, and positioned between the header plates 12. The first frame indexes 15 are members for positioning both ends of frames of the aircraft fuselage panel. The frames of the aircraft fuselage panel are positioned such that each frame extends in the width direction of the aircraft fuselage panel. Accordingly, the first frame indexes 15 are provided between the header plates 12 such that, with respect to the axial direction of the aircraft fuselage panel, the first frame indexes 15 correspond to both side edges of the aircraft fuselage panel.

In the example shown in FIG. 1, three to four first frame indexes 15 are provided between one side of ends of each pair of adjacent header plates 12, and also, three to four first frame indexes 15 are provided between the other ends of each pair of adjacent header plates 12. The number of first frame indexes 15 is not particularly limited, but may be suitably set in accordance with, for example, the number of frames of the aircraft fuselage panel. Similarly, the distances between the adjacent first frame indexes 15 are not particularly limited, but may be set in accordance with the distances between the frames of the aircraft fuselage panel. Also, the distances between each header plate 12 and its adjacent first frame indexes 15 may be suitably set in accordance with various conditions.

The second frame indexes 16 are provided on the upper surface of the center beam 11c, and positioned between the header plates 12. The second frame indexes 16 are members for positioning substantially the center portions of the frames of the aircraft fuselage panel. In the example shown in FIG. 1, three to four second frame indexes 16 are provided between both ends of each pair of adjacent header plates 12. The number of second frame indexes 16 is not particularly limited, but may be suitably set in accordance with, for example, the number of frames of the aircraft fuselage panel. Similarly, the distances between the second frame indexes 16 are not particularly limited, but may be set in accordance with the distances between the frames of the aircraft fuselage panel.

These frame indexes 15 and 16 may be configured to be fixed to the upper surfaces of the side beams 11a and 11b or the upper surface of the center beam 11c (i.e., fixed type), or may be configured to be advanceable upward from, and retractable to, the upper surfaces of the side beams 11a and 11b or the upper surface of the center beam 11c (i.e., movable type), or may be configured as a hybrid type, i.e., a combination of the fixed type and the movable type. In FIG. 1, the frame indexes 15 and 16 are illustrated as the fixed type. If the frame indexes 15 and 16 are configured as the movable type, the frame indexes 15 and 16 may include respective movers (e.g., electric cylinders) in a manner similar to the positioners 14. The frame indexes 15 and 16 are not limited to the members for positioning the frames of the aircraft fuselage panel, but may also be members for positioning the skin or other members of the aircraft fuselage panel.

Similar to the header plates 12, the end plate 17 is parallel to the header plates 12, and is disposed such that the end plate 17 extends between the upper surfaces of one end portions of the side beams 11a and 11b in a bridging manner. One end portion of the center beam 11c is fixed to the center portion of the end plate 17. In FIG. 1, the end plate 17 is positioned on the front side in the drawing, and the distance between the end plate 17 and the frontmost header plate 12 is narrower than the distance between any other pair of adjacent header plates 12.

Between the end plate 17 and its adjacent header plate 12, one first frame index 15 is provided on each of the side beams 11a and 11b, and one second frame index 16 is provided on the center beam 11c. The distance between the end plate 17 and the header plate 12, and also, the number of frame indexes 15 and 16 provided between these plates, are not particularly limited, but may be suitably set in accordance with, for example, the specific type of the aircraft fuselage panel.

Unlike the header plates 12, the end plate 17 is not provided with the receiving members 13 and the positioners 14. The end plate 17 serves to support one end of the base 11 by being fixed to the aforementioned one end portions of the side beams 11a and 11b and the aforementioned one end portion of the center beam 11c. The end plate 17 may be provided with, for example, a positioning device for positioning an end portion of the skin of the aircraft fuselage panel.

FIG. 2 shows a representative one of the header plates 12 shown in FIG. 1. It should be noted that, FIG. 2 schematically shows the cross section of each of the side beam 11a, the side beam 11b, and the center beam 11c. In the present embodiment, the center portion of the header plate 12 (i.e., the protruding portion of the curved shape), at which the center beam 11c is positioned, is not provided with the receiving members 13 and the positioners 14, but the other portions of the header plate 12 are provided with the receiving members 13 and the positioners 14 in such a manner that each of the receiving members 13 and each of the positioners 14 extend radially outward from the lower side.

Each positioner 14 is provided with a corresponding one of the receiving members 13 at its distal end, and causes the corresponding receiving member 13 to advance and retract. The upper face (surface, receiving surface) of each receiving member 13 comes into contact with the lower surface (or inner surface) of the aircraft fuselage panel (aircraft component/structure). The specific configurations of the receiving members 13 and the positioners 14 are not particularly limited, so long as the receiving members 13 are block-shaped members each having a surface that is properly contactable with the aircraft fuselage panel, and the positioners 14 are known actuators, such as electric cylinders, that can cause the respective receiving members 13 to advance and retract.

The positioners 14 are pillar-shaped, and arranged radially so that the positioners 14 can cause the respective receiving members 13 to advance upward (outward) from, and retract to, the header plate 12. Therefore, preferably, the axial direction (longitudinal direction) of each positioner 14 substantially corresponds to (i.e., extends along) the radial direction of the aircraft fuselage panel. Accordingly, the advancing/retracting direction of each receiving member 13 also corresponds to the radial direction of the aircraft fuselage panel.

The number of receiving members 13 and positioners 14 provided on each header plate 12, the distances between the adjacent positioners 14 (as well as the distances between the adjacent receiving members 13), etc., are not particularly limited, but may be suitably set in accordance with various conditions, such as the size, the shape, and the structure of the aircraft component (e.g., aircraft fuselage panel) to be placed on the aircraft component assembly jig 10A. In the example shown in FIG. 2 (and FIG. 1), the receiving members 13 and the positioners 14 are densely arranged near the center portion of the header plate 12, and relatively sparsely arranged around both side edges of the header plate 12. However, the arrangement of the receiving members 13 and the positioners 14 is not thus limited. For example, on the header plate 12, all of the receiving members 13 and the positioners 14 may be arranged at regular intervals, or the receiving members 13 and the positioners 14 may be arranged at partly irregular intervals.

[Example of a Control Configuration of the Aircraft Component Assembly Jig]

Next, one example of a control configuration of the aircraft component assembly jig 10A according to Embodiment 1 is specifically described with reference to FIG. 3 to FIG. 5.

Figure 3:
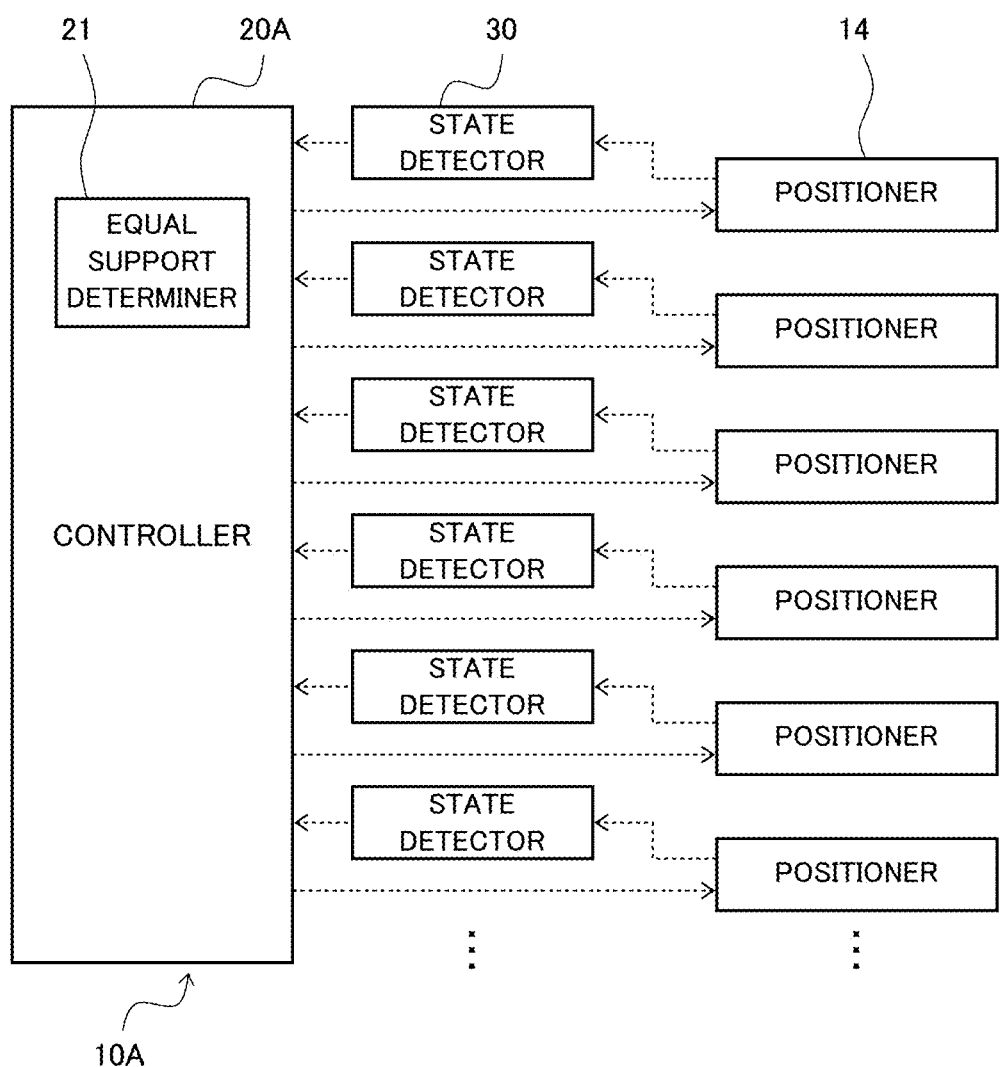
FIG. 3 is a block diagram showing a representative example of a control configuration of the aircraft component assembly jig of FIG. 1.

As shown in FIG. 3, the aircraft component assembly jig 10A according to this exemplary embodiment includes a controller 20A, which controls the positioners 14 such that the positioners 14 are drivable independently of each other. Since the positioners 14 support the respective receiving members 13 in an advanceable and retractable manner as described above, in a state where an aircraft component such as an aircraft fuselage panel is placed on the aircraft component assembly jig 10A, the lower surface of the aircraft component is supported by at least the receiving members 13. Here, since the positioners 14 are controlled independently of each other by the control performed by the controller 20A, the advancing/retracting positions of the respective receiving members 13 supporting the lower surface of the aircraft component can also be changed independently of each other.

As shown in FIG. 3, receiving member state detectors 30 are provided for the respective positioners 14. Each of the receiving member state detectors 30 obtains, from a corresponding one of the positioners 14 (or from a corresponding one of the receiving members 13), the supporting state of the corresponding receiving member 13 supporting the aircraft component, and outputs the obtained supporting state to the controller 20A. The controller 20A includes an equal support determiner 21. The equal support determiner 21 is a "determiner" that determines whether or not all the receiving members 13 are equally supporting the aircraft component (i.e., determines whether or not an equal support state is being achieved). Based on all the obtained supporting states, the controller 20A determines whether or not the equal support state is being achieved.

Based on the result of the determination by the equal support determiner 21, the controller 20A controls the driving of each of the positioners 14, thereby changing the advancing/retracting position of each of the receiving members 13. If it is determined that the equal support state is not being achieved, then until the equal support state is achieved, the controller 20A repeats the following: the obtaining of the supporting state of each of the receiving members 13; the determining by the equal support determiner 21; and the controlling of each of the positioners 14. It should be noted that, in some cases, the receiving member state detectors 30 are simply referred to as "state detectors 30" as shown in the blocks in FIG. 3.

The specific configurations of the controller 20A and the equal support determiner 21 are not particularly limited. The controller 20A and the equal support determiner 21 may adopt known configurations. For example, the controller 20A may be constituted by a known arithmetic processing device, such as a CPU of a microcomputer or microcontroller. The equal support determiner 21 may be realized, by software, as a function block of the arithmetic processing device constituting the controller 20A. Alternatively, the equal support determiner 21 may be realized by a dedicated arithmetic unit (e.g., a known arithmetic element or known arithmetic circuit) independent of the controller 20A. The functionality of the elements disclosed herein including but not limited to the controller 20A and the controller 20B may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Figure 4A:
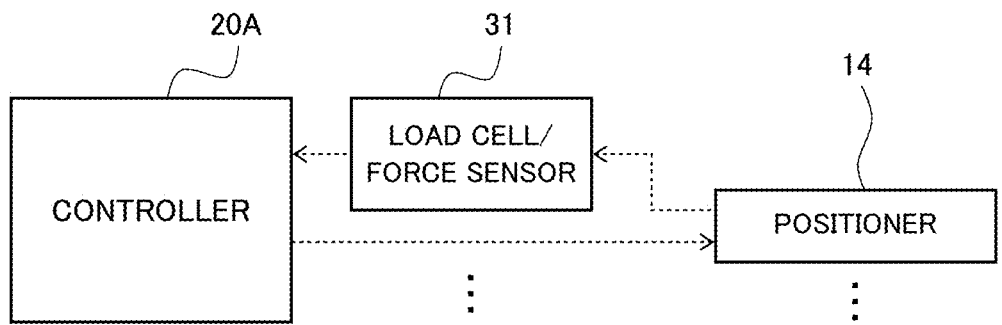
FIG. 4A to FIG. 4C are block diagrams each showing a representative example of a receiving member state detector in the aircraft component assembly jig of FIG. 3.
Figure 4B:
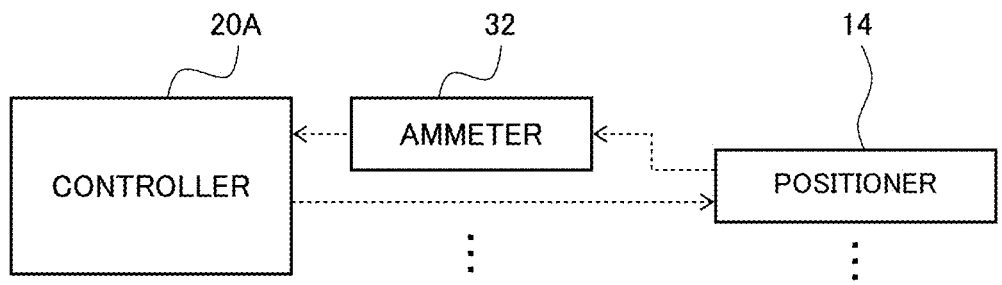
Figure 4C:
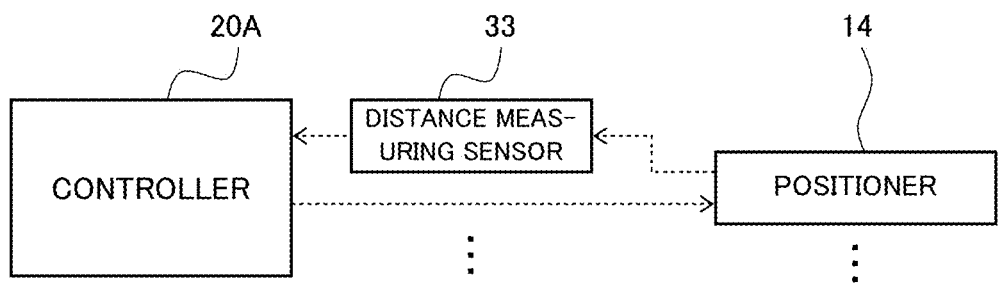

The specific configuration of each state detector 30 is not particularly limited. As shown in FIG. 4A, each state detector 30 may be a load cell or force sensor 31, which measures a load applied to the corresponding positioner 14. Alternatively, as shown in FIG. 4B, each state detector 30 may be an ammeter 32, which measures the electric current value of a driving motor included in the corresponding positioner 14. Further alternatively, as shown in FIG. 4C, each state detector 30 may be a distance measuring sensor 33, which measures the distance between the corresponding receiving member 13 and the aircraft component. Still further alternatively, each positioner 14 (or each receiving member 13) may include at least two of the load cell or force sensor 31, the ammeter 32, and the distance measuring sensor 33 (or all of these three) as the state detector 30, or may include a different state detector 30.

In a case where the state detector 30 is the distance measuring sensor 33, the distance measuring sensor 33 may measure an actual distance between the receiving member 13 and the aircraft component. However, as an alternative, the distance measuring sensor 33 may measure the amount of advancing/retracting movement of a support shaft (support rod) with which the positioner 14 supports the receiving member 13, and the amount of advancing/retracting movement of the support shaft (support rod) measured until the receiving member 13 comes into contact with the aircraft component may be obtained as the distance between the receiving member 13 and the aircraft component. FIG. 4C (as well as FIG. 3) is illustrated as if the distance measuring sensor 33 directly detects (as indicated by dotted arrow in the drawing) supporting state data from the positioner 14. However, the drawings are illustrated in such a manner merely for convenience, and do not exclude a configuration in which the distance measuring sensor 33 measures the distance between the receiving member 13 and the lower surface of the aircraft component.

Figure 5:
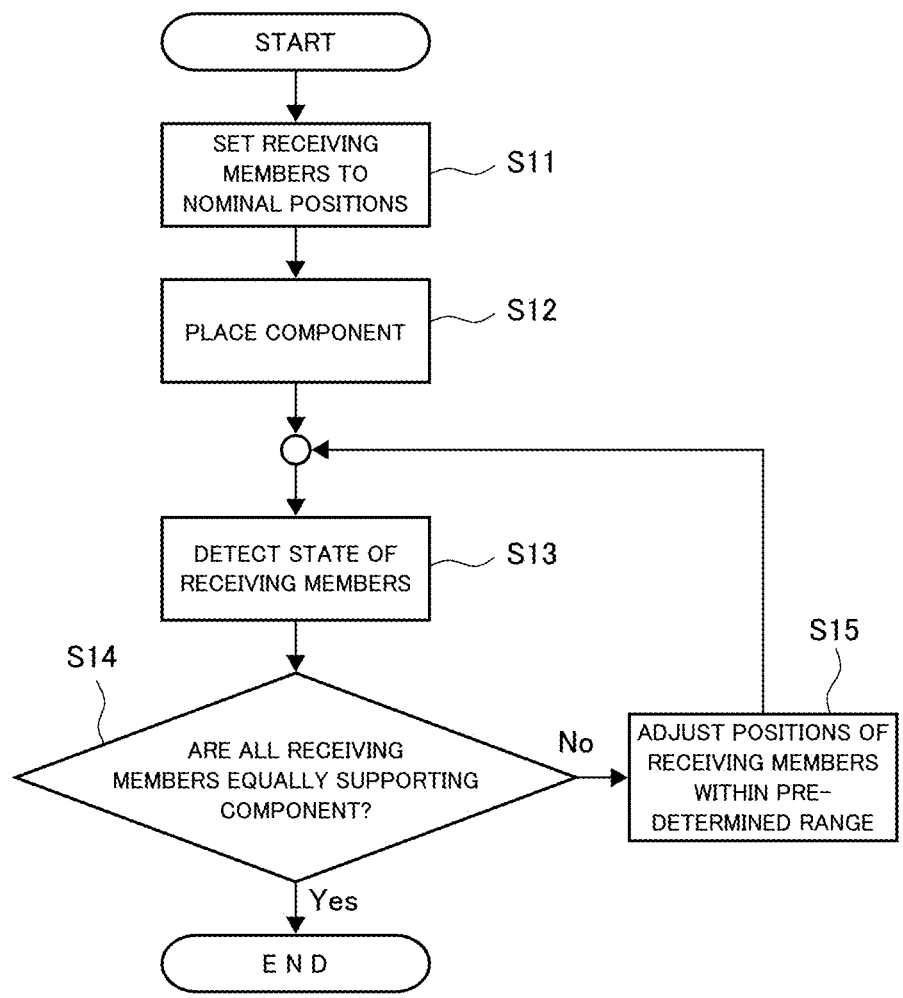
FIG. 5 is a flowchart showing one representative example of state control of receiving members, the state control being performed by the aircraft component assembly jig of FIG. 3.

Next, with reference to FIG. 5, a specific description is given of one representative example in which determinations regarding the equal support state are made by the state detectors 30, the controller 20A, and the equal support determiner 21.

First, the controller 20A controls the driving of all the positioners 14, and sets the advancing/retracting positions of all the receiving members 13 to respective nominal positions, which are ideal positions on CAD (i.e., ideal design positions) (step S11). Then, an aircraft component, such as an aircraft fuselage panel, is placed on the aircraft component assembly jig 10A (step S12).

After the aircraft component is placed on the aircraft component assembly jig 10A, each of the state detectors 30 detects the supporting state of a corresponding one of the receiving members 13, and outputs the detected supporting state to the controller 20A (step S13). The controller 20A causes the equal support determiner 21 to determine, based on the obtained supporting states of all the receiving members 13, whether or not all the receiving members 13 are equally supporting the aircraft component, i.e., determine whether or not the equal support state is being achieved (step S14). If the equal support determiner 21 determines that the equal support state is being achieved (Yes in step S14), the controller 20A ends the control.

On the other hand, if the equal support determiner 21 determines that the equal support state is not being achieved (No in step S14), the controller 20A controls adjustment-requiring positioners 14 (i.e., positioners 14 that require adjustment) among all the positioners 14 to adjust the advancing/retracting positions of the receiving members 13 of the adjustment-requiring positioners 14 within a predetermined range (step S15). Thereafter, the supporting state of each of the receiving members 13 is detected again (step S13), and the determination by the equal support determiner 21 is performed again (step S14). It should be noted that, depending on the result of the determination by the equal support determiner 21, the controller 20A may determine that not part of the positioners 14 but all of the positioners 14 require adjustment, and then the controller 20A may adjust the advancing/retracting positions of all the receiving members 13.

Hereinafter, determinations performed by the equal support determiner 21 regarding the equal support state are described more specifically. In a case where the state detector 30 is the load cell or force sensor 31 (see FIG. 4A), control data indicating the supporting state is a load applied to the positioner 14. In a case where the state detector 30 is the ammeter 32 (see FIG. 4B), control data indicating the supporting state is the electric current value of the driving motor included in the positioner 14. In a case where the state detector 30 is the distance measuring sensor 33, control data indicating the supporting state is the distance between the receiving member 13 and the aircraft component.

Accordingly, the equal support determiner 21 compares each of detection values of the control data with a preset reference value to determine whether or not a receiving member 13 that is excessively pushing the lower surface of the aircraft component upward (i.e., a receiving member 13 that is lifting the aircraft component) and/or a receiving member 13 that is not sufficiently pushing the lower surface of the aircraft component upward (i.e., a receiving members 13 on which the aircraft component is not sufficiently placed) is/are present among the receiving members 13. If the receiving member 13 that is excessively pushing the lower surface of the aircraft component upward or the receiving member 13 that is not sufficiently pushing the lower surface of the aircraft component upward is present among the receiving members 13, the equal support determiner 21 determines that the equal support state is not being achieved. Upon obtaining the determination result that the equal support state is not being achieved, the controller 20A drives the positioners 14 to cause the receiving members 13 to advance and/or retract, such that the position of the lower surface of the aircraft component is adjusted within the design tolerance of the aircraft component.

Figure 6:
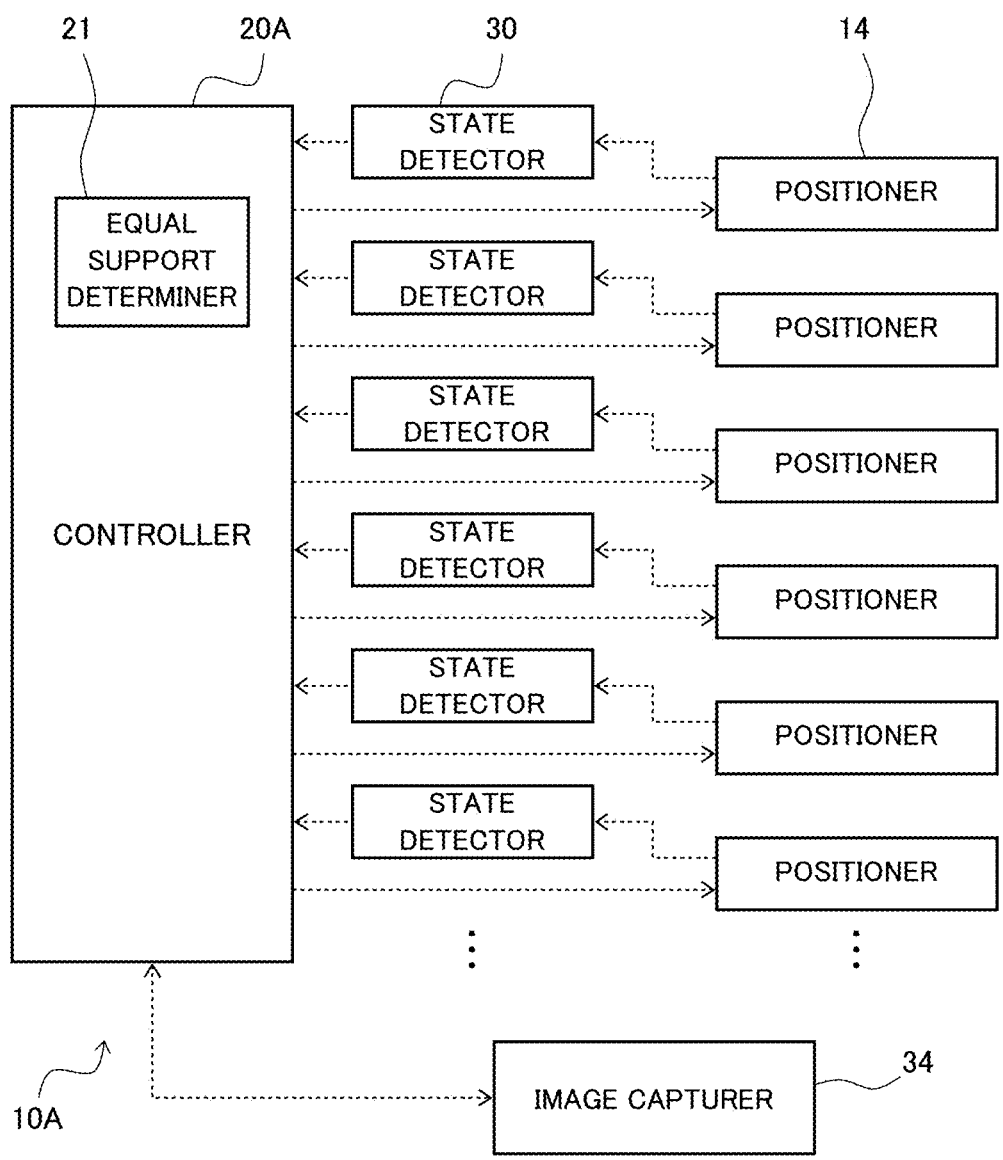
FIG. 6 is a block diagram showing another example of the control configuration of the aircraft component assembly jig of FIG. 3.

It should be noted that the control configuration of the aircraft component assembly jig 10A according to this exemplary embodiment is not limited to the one shown in FIG. 3. For example, as one variation of the aircraft component assembly jig 10A, FIG. 6 shows a configuration that further includes an image capturer 34, which captures an image showing the lower surface of the aircraft component being supported by at least the receiving members 13. The image captured by the image capturer 34 is used by the controller 20A to determine whether or not the aircraft component is in such a condition that assembling is performable thereon.

Specifically, for example, as previously described, the controller 20A drives the positioners 14 to cause the receiving members 13 to advance and/or retract, such that the position of the lower surface of the aircraft component is adjusted within the design tolerance of the aircraft component (step S15 of FIG. 5). Thereafter, the image capturer 34 captures an image showing the lower surface of the aircraft component being supported by at least the receiving members 13, and outputs the captured image to the controller 20A. Based on the captured image, the controller 20A determines whether or not there is a gap formed between the aircraft component and the header plates 12 or the receiving members 13, or determines whether or not the lower surface of the aircraft component has a preset proper shape.

If the controller 20A determines that there is no gap formed between the aircraft component and the header plates 12 or the receiving members 13, or determines that the lower surface of the aircraft component has the proper shape, then the controller 20A may determine that the aircraft component is in such a condition that assembling is performable thereon. On the other hand, if the controller 20A determines that there is a gap formed between the aircraft component and the header plates 12 or the receiving members 13, or determines that the lower surface of the aircraft component does not have the proper shape, then the controller 20A may drive the positioners 14 to cause the receiving members 13 to advance and/or retract (step S15 of FIG. 5), obtain the captured image from the image capturer 34 again, and determine whether or not there is a gap formed between the aircraft component and the header plates 12 or the receiving members 13, or determine whether or not the lower surface of the aircraft component has the proper shape.

Figure 7A:
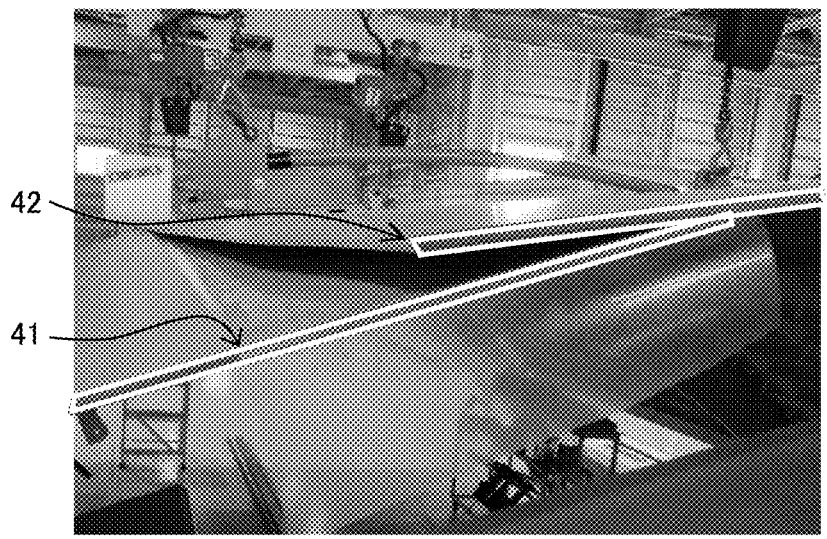
Figure 7B:
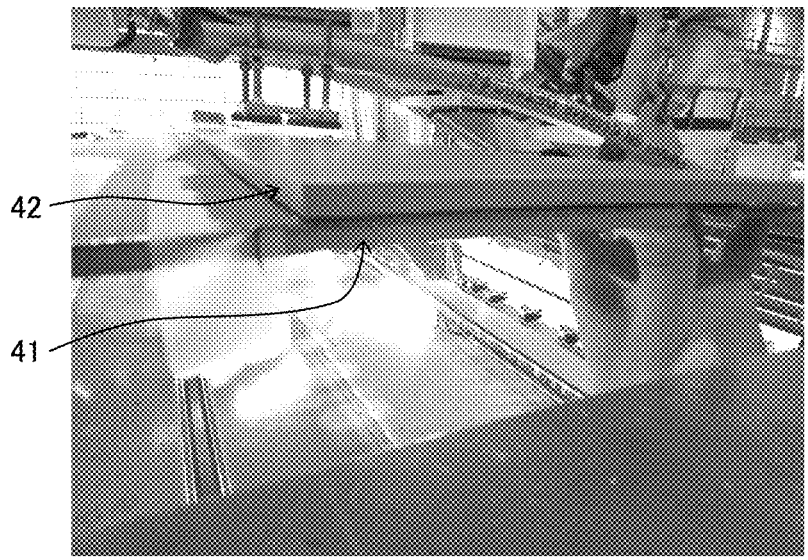
FIG. 7B shows a case where the aircraft component assembly jig according to an exemplary embodiment is used, in which case the coupling portions of the members that are to be coupled to each other are placed one on top of the other in a favorable manner.

Hereinafter, a description is given with reference to FIG. 7A and FIG. 7B. The description below describes that, at portions of respective members constituting the aircraft component, the portions being intended to be coupled to each other, i.e., at important interfacing portions, the positions of these members can be properly adjusted by the aircraft component assembly jig 10A according to this exemplary embodiment. Each of FIG. 7A and FIG. 7B shows an example case in which the aircraft component is an aircraft fuselage panel, and members constituting the aircraft fuselage panel are skins. In FIG. 7A, the contours of the skins are emphasized by white lines for the sake of convenience of the illustration.

Skins (e.g., two skins) 41 and 42 (in FIG. 7A and FIG. 7B, the lower skin is the skin 41 and the upper skin is the skin 42) are intended to be coupled to each other at their end portions (side portions or edge portions) by a conventional assembly jig. In this case, at the end portions of the lower skin 41 and the upper skin 42, the end portions being intended to be coupled to each other (i.e., at interfacing portions), the end portion of the upper skin 42 is significantly flipped upward relative to the lower skin 41 as shown in FIG. 7A, and the skin 41 and the skin 42 are so spaced apart from each other that the skin 41 and the skin 42 cannot be fastened together by rivets.

On the other hand, in the aircraft component assembly jig 10A according to this exemplary embodiment, as previously described, each of the detection values of the detected control data is compared with the preset reference value to determine whether or not the equal support state, in which the receiving members 13 equally support the skins 41 and 42, is being achieved. If it is determined that the equal support state is not being achieved, adjustment-requiring positioners 14 are controlled to adjust the advancing/retracting positions of the receiving members 13 of the adjustment-requiring positioners 14 within the design tolerance. As a result, as shown in FIG. 7B, the end portion of the upper skin 42 can be properly placed over the end portion of the lower skin 41.

As described above, the aircraft component assembly jig according to this exemplary embodiment is configured to include: header plates that are, in a state where an aircraft component is placed on the aircraft component assembly jig, arranged in a predetermined direction of the aircraft component, each header plate having such a shape that, in the state where the aircraft component is placed on the aircraft component assembly jig, each header plate extends along a lower surface or an upper surface of the aircraft component; positioners (e.g., electric cylinders) provided on each of the header plates, each positioner including, at a distal end thereof, a receiving member that comes into contact with the lower surface of the aircraft component, each positioner causing the receiving member to advance and retract (move upward and downward); a controller that controls the positioners such that the positioners are drivable independently of each other; and receiving member state detectors, each of which detects control data in the state where the aircraft component is placed on the aircraft component assembly jig, in which state the lower surface of the aircraft component is supported by at least a plurality of the receiving members, each receiving member state detector detecting, as the control data, a supporting state of a corresponding one of the receiving members supporting the lower surface of the aircraft component. The controller is configured to: compare each of detection values of the detected control data with a preset reference value to determine whether or not an equal support state is being achieved, the equal support state being a state where all the receiving members are equally supporting the aircraft component; and if it is determined that the equal support state is not being achieved, control at least one of all the positioners to adjust an advancing/retracting position of the receiving member of the at least one positioner within a design tolerance.

According to the above configuration, the supporting state (i.e., the state of receiving the lower surface) of each of the receiving members supporting the lower surface of the aircraft component is detected as the control data. Based on the control data, the controller determines whether or not the receiving members are equally supporting the lower surface of the aircraft component (i.e., determines whether or not the equal support state is being achieved). Accordingly, even if the aircraft component is a large structure, such as the skin of an aircraft fuselage panel, when the aircraft component is placed on the aircraft component assembly jig, the occurrence of a situation in which the aircraft component contacts only part of the receiving members (i.e., partial contact) can be effectively suppressed or prevented, which makes it possible to equally support the lower surface of the aircraft component by all the receiving members.

Consequently, even in the case of a large aircraft component, the orientation of the aircraft component placed on the aircraft component assembly jig can be properly kept without causing part of the aircraft component to be flipped upward. In addition, precise positional adjustment of interfacing portions of aircraft components, such as coupling portions of panels that are to be coupled to each other (i.e., the components' portions to be brought into contact with or coupled to each other) can be performed without applying excessive force to the interfacing portions.

In the aircraft component assembly jig with the above-described configuration, each receiving member state detector may be configured to detect, as the control data, at least one of the following: a load applied to a corresponding one of the positioners; an electric current value of a driving motor included in the corresponding positioner; and a distance between the corresponding positioner and the aircraft component. The controller may be configured to: compare each of the detection values of the detected control data with the preset reference value to determine whether or not a receiving member that is excessively pushing the lower surface of the aircraft component upward (i.e., a receiving member that is lifting the aircraft component upward) and/or a receiving member that is not sufficiently pushing the lower surface of the aircraft component upward (i.e., a receiving member on which the aircraft component is not sufficiently placed) is/are present among the receiving members; and if the receiving member that is excessively pushing the lower surface of the aircraft component upward or the receiving member that is not sufficiently pushing the lower surface of the aircraft component upward is present among the receiving members, drive the positioners to cause the receiving members to advance and/or retract, such that a position of the lower surface of the aircraft component is adjusted within a design tolerance of the aircraft component.

In the aircraft component assembly jig with the above-described configuration, each receiving member state detector may be configured as at least one of the following: (1) a load cell or force sensor that measures the load applied to the corresponding positioner; (2) an ammeter that measures the electric current value of the driving motor; and (3) a distance measuring sensor that measures the distance between the corresponding receiving member and the aircraft component.

The aircraft component assembly jig with the above-described configuration may be configured to further include an image capturer that captures an image showing the lower surface of the aircraft component being supported by at least the receiving members. The controller may be configured to: drive the positioners to cause the receiving members to advance and/or retract, such that a position of the lower surface of the aircraft component is adjusted within the design tolerance of the aircraft component; then, based on the image captured by the image capturer, determine whether or not there is a gap formed between the aircraft component and the header plates or the receiving members, or determine whether or not the lower surface of the aircraft component has a preset proper shape; and if it is determined that there is no gap formed between the aircraft component and the header plates or the receiving members, or that the lower surface of the aircraft component has the preset proper shape, determine that the aircraft component is in such a condition that assembling is performable thereon.

In the aircraft component assembly jig with the above-described configuration, the aircraft component may be an aircraft fuselage panel. The aircraft component assembly jig may be configured to include frame indexes for positioning both ends of members constituting the aircraft fuselage panel in the state where the aircraft fuselage panel is placed on the aircraft component assembly jig.

In the exemplary embodiment described above, one representative example of the aircraft component assembly jig has been described. Hereinafter, in the following exemplary embodiment, a description is given of one representative example of an aircraft component inspection tool, to which the same structure and same control as those adopted by the aircraft component assembly jig are applied.

Figure 8:
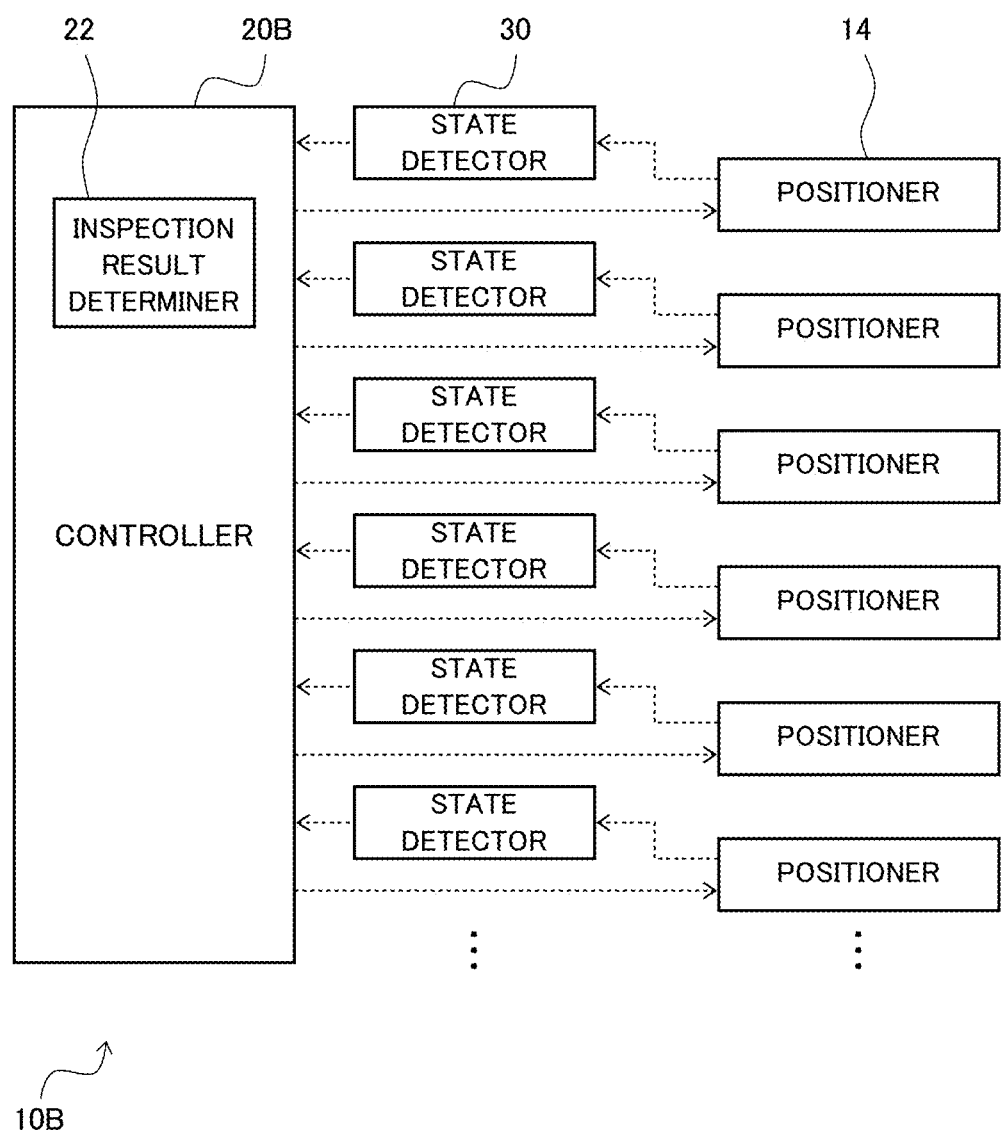
FIG. 8 is a diagram showing a representative example of a control configuration of an aircraft component inspection tool according to an exemplary embodiment of the present disclosure.

Since a specific structural example of the aircraft component inspection tool according to the following exemplary embodiment is the same as that of the aircraft component assembly jig 10A illustratively shown in FIG. 1 and FIG. 2, the description thereof is omitted in the following exemplary embodiment. As shown in FIG. 8, the control configuration of the aircraft component inspection tool 10B according to this exemplary embodiment is the same as the control configuration of the aircraft component assembly jig 10A illustratively shown in FIG. 3, except that a controller 20B of the aircraft component inspection tool 10B includes an inspection result determiner 22 instead of the equal support determiner 21 of the controller 20A.

It should be noted that, as described above in the earlier exemplary embodiment, the state detector 30 may be the load cell or force sensor 31, the ammeter 32, the distance measuring sensor 33 (see FIG. 4A to FIG. 4C), or any other detector. The aircraft component inspection tool 10B may include the image capturer 34, and the controller 20B may be configured to, based an image captured by the image capturer 34, the image showing the state of supporting the aircraft component, determine whether or not there is a gap formed between the aircraft component and the header plates 12 or the receiving members 13, or determine whether or not the lower surface of the aircraft component has a preset proper shape (see FIG. 6). In an exemplary embodiment, header plates 12 that are, in a state where an aircraft structure is placed on the aircraft structure assembly jig 10A, arranged spaced apart from each other in a predetermined direction of the aircraft structure, each header plate 12 aligned along lines orthogonal to the predetermined direction, each header plate 12 having such a shape that, in the state where the aircraft structure is placed on the aircraft structure assembly jig 10A, each header plate 12 extends along a lower surface or an upper surface of the aircraft structure Next, a description is given of representative examples of an aircraft component inspection method performed by the aircraft component inspection tool 10B according to this exemplary embodiment. The inspection method is specifically described with reference to a first example shown in FIG. 9 and a second example shown in FIG. 10. It goes without saying that a specific manner of performing the inspection method can be suitably changed in accordance with various conditions, and that the manner of performing the inspection method is not necessarily limited to the first example shown in FIG. 9 and the second example shown in FIG. 10.

Figure 9:
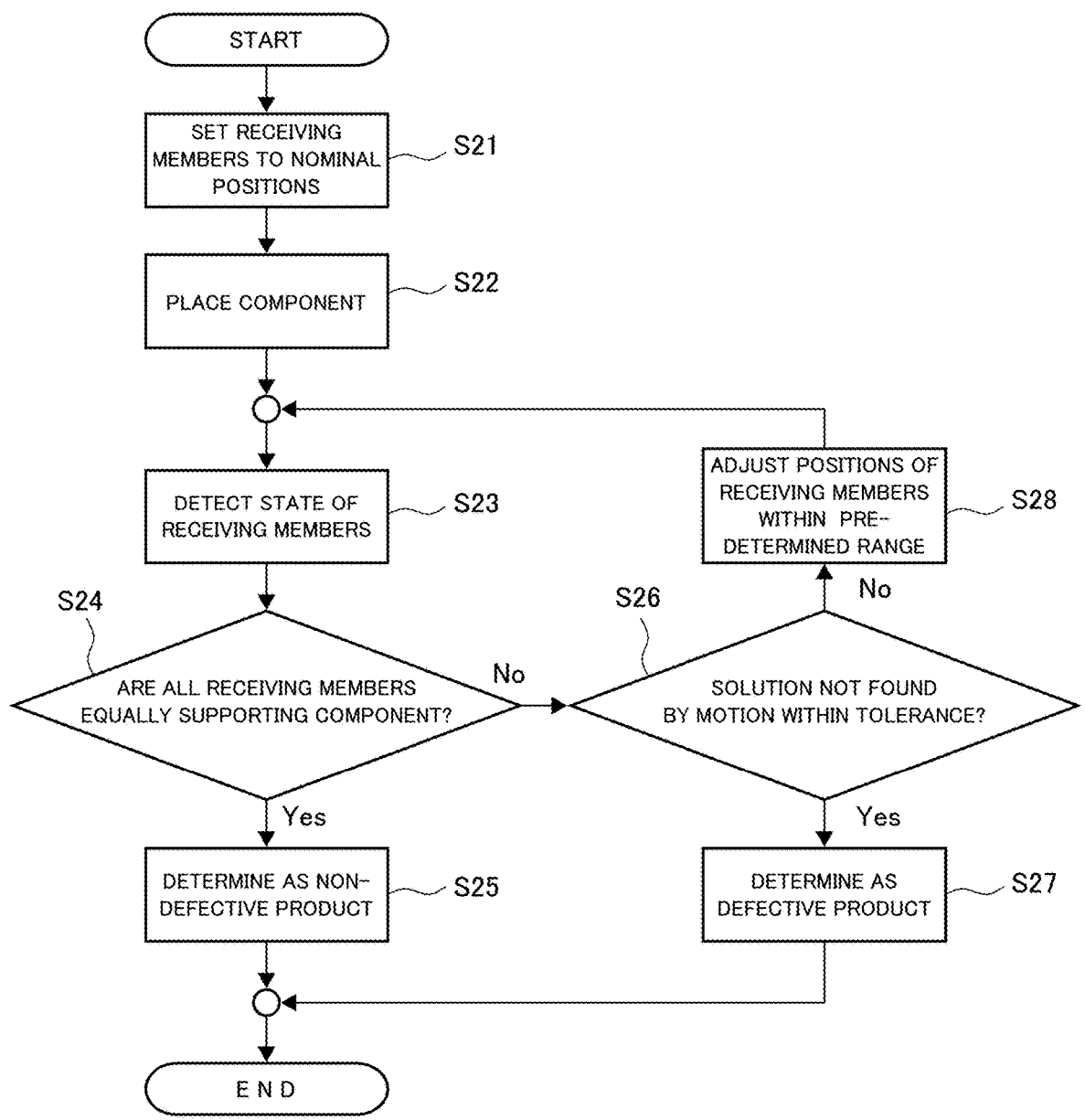
FIG. 9 is a flowchart showing one representative example of component shape determination control performed by the aircraft component inspection tool of FIG. 8.

First, the first inspection method example shown in FIG. 9 is described. The controller 20B of the aircraft component inspection tool 10B controls the driving of all the positioners 14, and sets the advancing/retracting positions of all the receiving members 13 to respective nominal positions, which are ideal positions on CAD (i.e., ideal design positions) (step S21). At the time, the motion range of the receiving members 13 is limited to fall within the design tolerance. Then, an aircraft component, such as an aircraft fuselage panel, is placed on the aircraft component inspection tool 10B (step S22).

After the aircraft component is placed on the aircraft component inspection tool 10B, each of the state detectors 30 detects the supporting state of a corresponding one of the receiving members 13, and outputs the detected supporting state to the controller 20B (step S23). The controller 20B causes the inspection result determiner 22 to determine, based on the obtained supporting states of all the receiving members 13, whether or not all the receiving members 13 are equally supporting the aircraft component, i.e., determine whether or not the equal support state is being achieved (step S24). At the time, if measured gaps are zero, it may be determined that all the receiving members 13 are equally supporting the aircraft component (i.e., the equal support state is being achieved). If it is determined that the equal support state is being achieved (Yes in step S24), the inspection result determiner 22 determines that the aircraft component placed on the aircraft component inspection tool 10B is a "non-defective product" since the aircraft component has a proper component shape (step S25), and the controller 20B ends the control.

On the other hand, if the inspection result determiner 22 determines that the equal support state is not being achieved (No in step S24), the controller 20B controls the positioners 14 to cause at least one of the receiving members 13 to advance and/or retract within the design tolerance, and determines whether or not a solution is found by causing the at least one receiving member 13 to advance and/or retract (i.e., by causing motion of the at least one receiving member 13) within the design tolerance, i.e., determines whether or not the equal support state is achievable by causing the at least one receiving member 13 to advance and/or retract within the design tolerance (step S26). At the time, if the motion of the at least one receiving member 13 exceeds a preset upper limit, or if the number of times the inspection result determiner 22 has repeated the determination exceeds a preset specific number of times, it can be determined that a solution is not found. If a solution is not found by causing the at least one receiving member 13 to advance and/or retract within the design tolerance (Yes in step S26), the inspection result determiner 22 determines that the aircraft component placed on the aircraft component inspection tool 10B is a "defective product" since the aircraft component does not have the proper component shape (step S27), and the controller 20B ends the control.

On the other hand, if a solution is found by causing the at least one receiving member 13 to advance and/or retract within the design tolerance (No in step S26), the controller 20B controls adjustment-requiring positioners 14 to adjust the advancing/retracting positions of the receiving members 13 of the adjustment-requiring positioners 14 within a predetermined range (step S28). Then, the supporting state of each of the receiving members 13 is detected again (step S23), and the determination by the inspection result determiner 22 is performed again (step S24).

Figure 10:
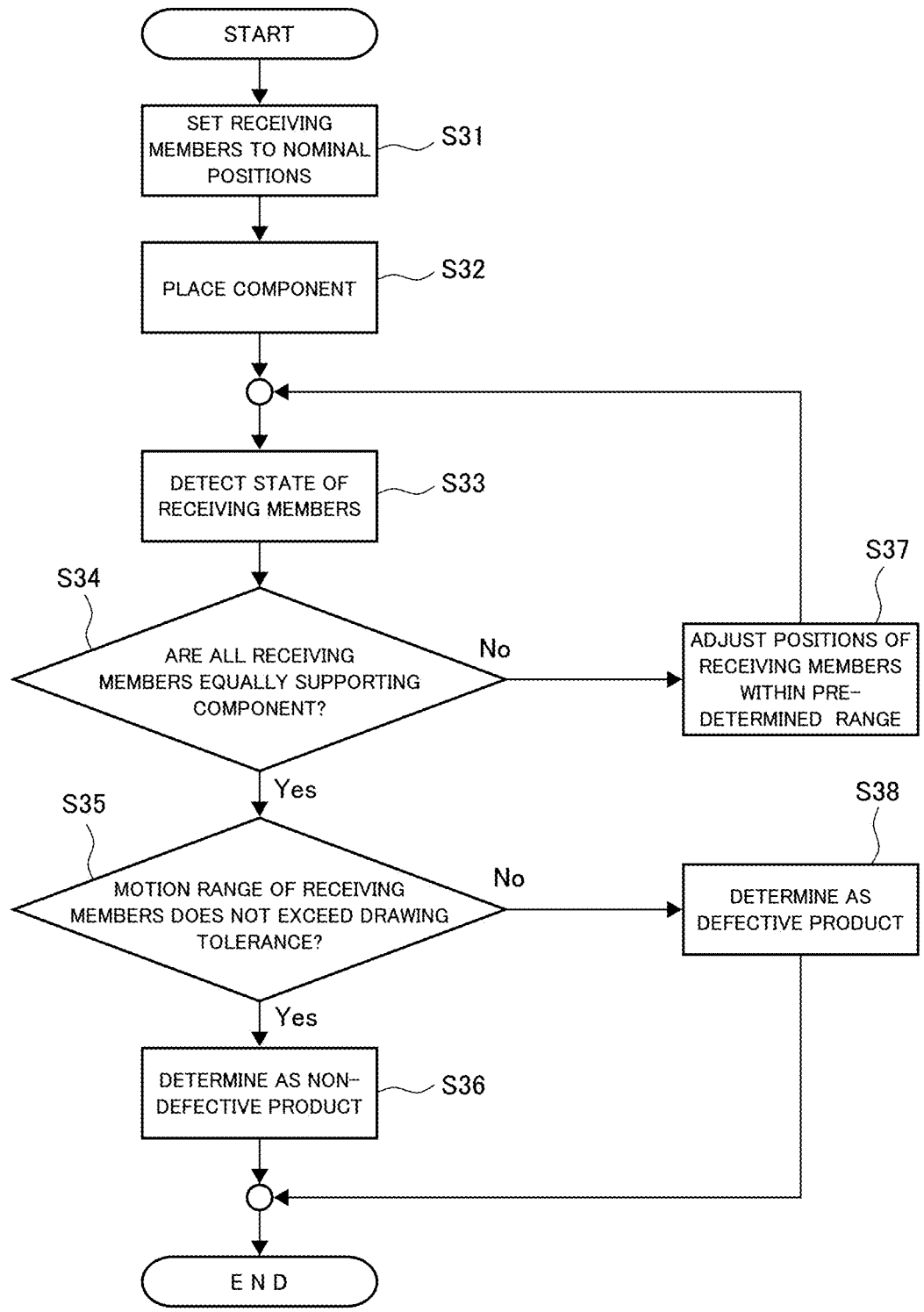
FIG. 10 is a flowchart showing another representative example of the component shape determination control performed by the aircraft component inspection tool of FIG. 8.

Next, the second inspection method example shown in FIG. 10 is described. The controller 20B of the aircraft component inspection tool 10B sets the advancing/retracting positions of all the receiving members 13 to respective nominal positions (step S31). An aircraft component, such as an aircraft fuselage panel, is placed on the aircraft component inspection tool 10B (step S32). Each of the state detectors 30 detects the supporting state of a corresponding one of the receiving members 13, and outputs the detected supporting state to the controller 20B (step S33). The controller 20B causes the inspection result determiner 22 to determine, based on the obtained supporting states of all the receiving members 13, whether or not the equal support state is being achieved (step S34). These steps S31 to S34 are the same as steps S21 to S24 of the first inspection method example shown in FIG. 9.

If the inspection result determiner 22 determines that the equal support state is being achieved (Yes in step S34), the inspection result determiner 22 further determines whether or not the motion range of the receiving members 13 has exceeded the design tolerance (step S35). If it is determined that the motion range of the receiving members 13 has not exceeded the design tolerance, or if it is determined that the motion of none of the receiving members 13 has exceeded a preset upper limit (Yes in step S35), the inspection result determiner 22 determines that the aircraft component placed on the aircraft component inspection tool 10B is a "non-defective product" since the aircraft component has a proper component shape (step S36), and the controller 20B ends the control.

On the other hand, if the inspection result determiner 22 determines that the equal support state is not being achieved (No in step S34), the controller 20B controls adjustment-requiring positioners 14 to adjust the advancing/retracting positions of the receiving members 13 of the adjustment-requiring positioners 14 within a predetermined range (step S37). Then, the supporting state of each of the receiving members 13 is detected again (step S33), and the determination by the inspection result determiner 22 is performed again (step S34).

If the inspection result determiner 22 determines that the motion range of the receiving members 13 has exceeded the design tolerance (No in step S35), the inspection result determiner 22 determines that the aircraft component placed on the aircraft component inspection tool 10B is a "defective product" since the aircraft component does not have the proper component shape (step S38), and the controller 20B ends the control.

It should be noted that the criteria for the inspection result determiner 22 to determine that the equal support state is not being achieved are the same as the determination criteria used by the equal support determiner 21 in the earlier exemplary embodiment. That is, the criteria for the inspection result determiner 22 to determine that the equal support state is not being achieved may be at least one of the following: (1) the moving amount of any of the receiving members 13 exceeds the design tolerance; (2) a load applied to any of the receiving members 13 deviates from an equal load range; and (3) there is a gap formed between the lower surface of the aircraft component and the receiving members 13. The inspection result determiner 22 can determine whether or not there is a gap formed between the lower surface of the aircraft component and the receiving members 13 not only by using the supporting states detected by the state detectors 30, but also by using the aforementioned image captured by the image capturer 34.

In this exemplary embodiment, the aircraft component inspection tool 10B has been described as a jig (a device) that is different from the aircraft component assembly jig TOA according to the earlier exemplary embodiment. However, as described above, the aircraft component inspection tool 10B according to this exemplary embodiment and the aircraft component assembly jig 10A according to the earlier exemplary embodiment share the same jig structure. Therefore, for example, the control configuration adopted by the controller 20B of the aircraft component inspection tool 10B according to this exemplary embodiment (e.g., the control configuration illustratively shown in FIG. 8 and FIG. 9) may be applied to the controller 20A of the aircraft component assembly jig TOA according to the earlier exemplary embodiment, and this consequently makes it possible to use the aircraft component assembly jig TOA as the aircraft component inspection tool 10B.

As described above, the aircraft component inspection tool according to this exemplary embodiment is configured to include: header plates that are, in a state where an aircraft component is placed on the aircraft component inspection tool, arranged in a predetermined direction of the aircraft component, each header plate having such a shape that, in the state where the aircraft component is placed on the aircraft component inspection tool, each header plate extends along a lower surface or an upper surface of the aircraft component; positioners (e.g., electric cylinders) provided on each of the header plates, each positioner including, at a distal end thereof, a receiving member that comes into contact with the lower surface of the aircraft component, each positioner causing the receiving member to advance and retract (move upward and downward); and a controller that controls the positioners such that the positioners are drivable independently of each other. In a state where the receiving members are set to respective nominal positions, the aircraft component is placed on at least the receiving members. The controller is configured to: in a state where the aircraft component is placed on the receiving members, determine whether or not an equal support state is being achieved, the equal support state being a state where the receiving members are equally supporting the aircraft component; if it is determined that the equal support state is not being achieved, control the positioners to cause at least one of the receiving members to advance and/or retract within a design tolerance; and if it is determined that the equal support state is not achievable by causing the at least one receiving member to advance and/or retract within the design tolerance, determine that the aircraft component does not have a proper component shape.

According to the above configuration, when the aircraft component is placed on the aircraft component inspection tool, whether or not the aircraft component has a proper component shape is determined based on whether or not the equal support state is achievable by making positional adjustment of the receiving members within the design tolerance (i.e., based on whether or not a solution is found by making the positional adjustment of the receiving members). Accordingly, even if the aircraft component is a large structure, such as the skin of an aircraft fuselage panel, whether the aircraft component has a proper component shape or an improper component shape can be determined. Consequently, even if the aircraft component is a large structure, the shape of the aircraft component can be determined accurately. Moreover, according to the above-described configuration, substantially the same configuration as that of the aircraft component assembly jig can be used for inspecting the aircraft component. Thus, the aircraft component assembly jig can double as the aircraft component inspection tool.

In the aircraft component inspection tool with the above-described configuration, the controller may be configured to determine that the equal support state is not being achieved when at least one of the following occurs: (1) a moving amount of any of the receiving members exceeds the design tolerance; (2) a load applied to any of the receiving members deviates from an equal load range; and (3) a gap is formed between the lower surface of the aircraft component and the receiving members.

In the aircraft component inspection tool with the above-described configuration, the aircraft component may be an aircraft fuselage panel, and the aircraft component inspection tool may be configured to include frame indexes for positioning both ends of members constituting the aircraft fuselage panel in the state where the aircraft fuselage panel is placed on the aircraft component inspection tool.

The aircraft component inspection tool with the above-described configuration may be configured to include receiving member state detectors, each of which detects control data when the lower surface of the aircraft component is supported by at least the receiving members, each receiving member state detector detecting, as the control data, a supporting state of a corresponding one of the receiving members supporting the lower surface of the aircraft component. The controller may be configured to compare each of detection values of the detected control data with a preset reference value to determine whether or not the equal support state is being achieved, the equal support state being a state where all the receiving members are equally supporting the aircraft component.

In the aircraft component inspection tool with the above-described configuration, each receiving member state detector may be configured as at least one of the following: a load cell or force sensor that measures a load applied to a corresponding one of the positioners; an ammeter that measures an electric current value of a driving motor included in the corresponding positioner; and a distance measuring sensor that measures a distance between the corresponding receiving member and the aircraft component.

The aircraft component inspection tool with the above-described configuration may be configured to further include an image capturer that captures an image showing the lower surface of the aircraft component being supported by at least the receiving members. The controller may be configured to: if it is determined that the equal support state is not achievable, then further determine whether or not there is a gap formed between the aircraft component and the receiving members, or determine whether or not the lower surface of the aircraft component has a preset proper shape, based on the image captured by the image capturer; and if it is determined that there is a gap formed between the aircraft component and the receiving members, or that the lower surface of the aircraft component does not have the preset proper shape, determine that the aircraft component does not have the proper component shape.

Owing to the above-described configurations, the present disclosure has an advantageous effect of being able to provide an aircraft component assembly jig and an aircraft component inspection tool, the aircraft component assembly jig being capable of favorably suppressing or preventing slight lifting of the aircraft component by the receiving members, the aircraft component inspection tool being capable of accurately determining the shape of the aircraft component by utilizing the capability to suppress or prevent the lifting by the receiving members.

From the foregoing description, numerous modifications and other embodiments of the present disclosure are obvious to a person skilled in the art. Therefore, the foregoing description should be interpreted only as an example and is provided for the purpose of teaching the best mode for carrying out the present disclosure to a person skilled in the art. The structural and/or functional details may be substantially modified without departing from the spirit of the present disclosure.

INDUSTRIAL APPLICABILITY

The present disclosure is widely and suitably applicable, for example, in the field of assembling an aircraft component, such as an aircraft fuselage panel. The present disclosure is also widely and suitably applicable in the field of inspecting an aircraft component, such as an aircraft fuselage panel.

REFERENCE SIGNS LIST

10A: aircraft component assembly jig
10B: aircraft component inspection tool
11: base
11a, 11b: side beam
11c: center beam
11d: support pillar
12: header plate
13: receiving member
14: positioner
15: first frame index
16: second frame index
17: end plate
20A, 20B: controller
21: equal support determiner
22: inspection result determiner
30: receiving member state detector
31: load cell or force sensor
32: ammeter
33: distance measuring sensor
34: image capturer

The invention claimed is:

1. An aircraft structure assembly jig comprising:
header plates that are, in a state where an aircraft structure is placed on the aircraft structure assembly jig, arranged in a predetermined direction of the aircraft structure, each header plate having such a shape that, in the state where the aircraft structure is placed on the aircraft structure assembly jig, each header plate extends abutting a lower surface or an upper surface of the aircraft structure;
positioners provided on each of the header plates, each positioner including, at a distal end thereof, a receiver that comes into contact with the lower surface of the aircraft structure, each positioner causing the receiver to advance and retract;
circuitry that controls the positioners such that the positioners are drivable independently of each other;
receiver state sensors, each of which detects control data in the state where the aircraft structure is placed on the aircraft structure assembly jig, in which state the lower surface of the aircraft structure is supported by at least receivers, each receiver state sensor detecting, as the control data, a supporting state of a corresponding one of the receivers supporting the lower surface of the aircraft structure, wherein
the circuitry:
compares each of detection values of the detected control data with a preset reference value to determine whether or not an equal support state is being achieved, the equal support state being a state where all the receivers are equally supporting the aircraft structure; and
if it is determined that the equal support state is not being achieved, controls an adjustment-requiring positioner among all the positioners to adjust an advancing/retracting position of the receiver of the adjustment-requiring positioner within a design tolerance,
wherein
each receiver state sensor detects, as the control data, at least one of the following:
a load applied to a corresponding one of the positioners;
an electric current value of a driving motor included in the corresponding positioner; and
an amount of advancing or retracting movement of a support shaft with which the corresponding positioner supports the receiver, and
the circuitry:
compares each of the detection values of the detected control data with the preset reference value to determine whether or not a receiver that is excessively pushing the lower surface of the aircraft structure upward and/or a receiver that is not sufficiently pushing the lower surface of the aircraft structure upward is/are present among the receivers;
an image capturer that captures an image showing the lower surface of the aircraft structure being supported by at least the receivers, wherein the circuitry:
drives the positioners to cause the receivers to advance and/or retract, such that the position of the lower surface of the aircraft structure is adjusted within a design tolerance of the aircraft structure;
then, based on the image captured by the image capturer, determines whether or not there is a gap formed between the aircraft structure and the header plates or the receivers, or determines whether or not the lower surface of the aircraft structure has a preset proper shape; and
if it is determined that there is no gap formed between the aircraft structure and the header plates or the receivers, or that the lower surface of the aircraft structure has the preset proper shape, determines that the aircraft structure is in such a condition that assembling is performable thereon.

2. The aircraft structure assembly jig according to claim 1, wherein each receiver state sensor is at least one of the following:
a load cell or force sensor that measures the load applied to the corresponding positioner;
an ammeter that measures the electric current value of the driving motor; and a distance measuring sensor that measures a distance between the corresponding receiver and the aircraft structure.

3. The aircraft structure assembly jig according to claim 1, wherein
the aircraft structure is an aircraft fuselage panel, and
the aircraft structure assembly jig comprises frame indexes for positioning both ends of structures constituting the aircraft fuselage panel in the state where the aircraft fuselage panel is placed on the aircraft structure assembly jig.

4. An aircraft structure inspection tool comprising:
header plates that are, in a state where an aircraft structure is placed on the aircraft structure inspection tool, arranged in a predetermined direction of the aircraft structure, each header plate having such a shape that, in the state where the aircraft structure is placed on the aircraft structure inspection tool, each header plate extends along a lower surface or an upper surface of the aircraft structure;
positioners provided on each of the header plates, each positioner including, at a distal end thereof, a receiver that comes into contact with the lower surface of the aircraft structure, each positioner causing the receiver to advance and retract;
receiver state sensors, each of which detects control data when the lower surface of the aircraft structure is supported by at least the receivers, each receiver state sensor detecting, as the control data, a supporting state of a corresponding one of the receivers supporting the lower surface of the aircraft structure;
circuitry that controls the positioners such that the positioners are drivable independently of each other, wherein
in a state where the receivers are set to respective nominal positions, the aircraft structure is placed on at least the receivers, and
the circuitry:
in a state where the aircraft structure is placed on the receivers, determines whether or not an equal support state is being achieved, the equal support state being a state where the receivers are equally supporting the aircraft structure;
if it is determined that the equal support state is not being achieved, controls the positioners to cause at least one of the receivers to advance and/or retract within a design tolerance; and
if it is determined that the equal support state is not achievable by causing the at least one receiver to advance and/or retract within the design tolerance, determines that the aircraft structure does not have a proper structure shape,
wherein
each receiver state sensor detects, as the control data, at least one of the following:
a load applied to a corresponding one of the positioners;
an electric current value of a driving motor included in the corresponding positioner; and
an amount of advancing or retracting movement of a support shaft with which the corresponding positioner supports the receiver; and
an image capturer that captures an image showing the lower surface of the aircraft structure being supported by at least the receivers, wherein the circuitry:
if it is determined that the equal support state is not achievable, then further determines whether or not there is a gap formed between the aircraft structure and the receivers, or determines whether or not the lower surface of the aircraft structure has a preset proper shape, based on the image captured by the image capturer; and
if it is determined that there is no gap formed between the aircraft structure and the receivers, or that the lower surface of the aircraft structure does not have the preset proper shape, determines that the aircraft structure does not have the proper structure shape.

5. The aircraft structure inspection tool according to claim 4, wherein
the circuitry determines that the equal support state is not being achieved when at least one of the following occurs:
a moving amount of any of the receivers exceeds the design tolerance;
a load applied to any of the receivers deviates from an equal load range; and
the gap is formed between the lower surface of the aircraft structure and the receivers.

6. The aircraft structure inspection tool according to claim 4, wherein
the aircraft structure is an aircraft fuselage panel, and
the aircraft structure inspection tool comprises frame indexes for positioning both ends of structures constituting the aircraft fuselage panel in the state where the aircraft fuselage panel is placed on the aircraft structure inspection tool.

7. The aircraft structure inspection tool according to claim 4, wherein
the circuitry compares each of detection values of the detected control data with a preset reference value to determine whether or not the equal support state is being achieved, the equal support state being a state where all the receivers are equally supporting the aircraft structure.

8. The aircraft structure inspection tool according to claim 7, wherein
each receiver state sensor is at least one of the following:
a load cell or force sensor that measures a load applied to a corresponding one of the positioners;
an ammeter that measures an electric current value of a driving motor included in the corresponding positioner; and
a distance measuring sensor that measures a distance between the corresponding receiver and the aircraft structure.

9. An aircraft structure assembly jig comprising:
header plates that are, in a state where an aircraft structure is placed on the aircraft structure assembly jig, arranged in a predetermined direction of the aircraft structure, each header plate having such a shape that, in the state where the aircraft structure is placed on the aircraft structure assembly jig, each header plate extends along a lower surface or an upper surface of the aircraft structure;
a plurality of means for positioning provided on each of the header plates, each means for positioning including, at a distal end thereof, a means for receiving that comes into contact with the lower surface of the aircraft structure, each means for positioning causing the means for receiving to advance and retract;
circuitry that controls the plurality of means for positioning such that the plurality of means for positioning are drivable independently of each other;

receiver state sensors, each of which detects control data in the state where the aircraft structure is placed on the aircraft structure assembly jig, in which state the lower surface of the aircraft structure is supported by at least a plurality of means for receiving, each receiver state sensor detecting, as the control data, a supporting state of a corresponding one of the plurality of means for receiving supporting the lower surface of the aircraft structure, wherein the circuitry:
compares each of detection values of the detected control data with a preset reference value to determine whether or not an equal support state is being achieved, the equal support state being a state where all the plurality of means for receiving are equally supporting the aircraft structure; and
if it is determined that the equal support state is not being achieved, controls an adjustment-requiring positioner among all the positioners to adjust an advancing/retracting position of the means for receiving of the adjustment-requiring positioner within a design tolerance, wherein
each receiver state sensor detects, as the control data, at least one of the following:
a load applied to a corresponding one of the plurality of means for positioning;
an electric current value of a driving motor included in the corresponding means for positioning; and
an amount of advancing or retracting movement of a support shaft with which the corresponding means for positioning supports the means for receiving, and the circuitry:
compares each of the detection values of the detected control data with the preset reference value to determine whether or not a means for receiving that is excessively pushing the lower surface of the aircraft structure upward and/or a means for receiving that is not sufficiently pushing the lower surface of the aircraft structure upward is/are present among the plurality of means for receiving;

an image capturer that captures an image showing the lower surface of the aircraft structure being supported by at least the plurality of means for receiving, wherein the circuitry:
drives the plurality of means for positioning to cause the plurality of means for receiving to advance and/or retract, such that the position of the lower surface of the aircraft structure is adjusted within a design tolerance of the aircraft structure;
then, based on the image captured by the image capturer, determines whether or not there is a gap formed between the aircraft structure and the header plates or the plurality of means for receiving, or determines whether or not the lower surface of the aircraft structure has a preset proper shape; and
if it is determined that there is no gap formed between the aircraft structure and the header plates or the plurality of means for receiving, or that the lower surface of the aircraft structure has the preset proper shape, determines that the aircraft structure is in such a condition that assembling is performable thereon.

10. The aircraft structure assembly jig according to claim 9, wherein
each receiver state sensor is at least one of the following:
a load cell or force sensor that measures the load applied to the corresponding means for positioning;
an ammeter that measures the electric current value of the driving motor; and
a distance measuring sensor that measures a distance between the corresponding means for receiving and the aircraft structure.

11. The aircraft structure assembly jig according to claim 9, wherein
the aircraft structure is an aircraft fuselage panel, and
the aircraft structure assembly jig comprises frame indexes for positioning both ends of structures constituting the aircraft fuselage panel in the state where the aircraft fuselage panel is placed on the aircraft structure assembly jig.

* * * * *